G. G. THORP.
FURNACE.
APPLICATION FILED MAY 29, 1914.
1,144,511.
Patented June 29, 1915.
3 SHEETS—SHEET 1.
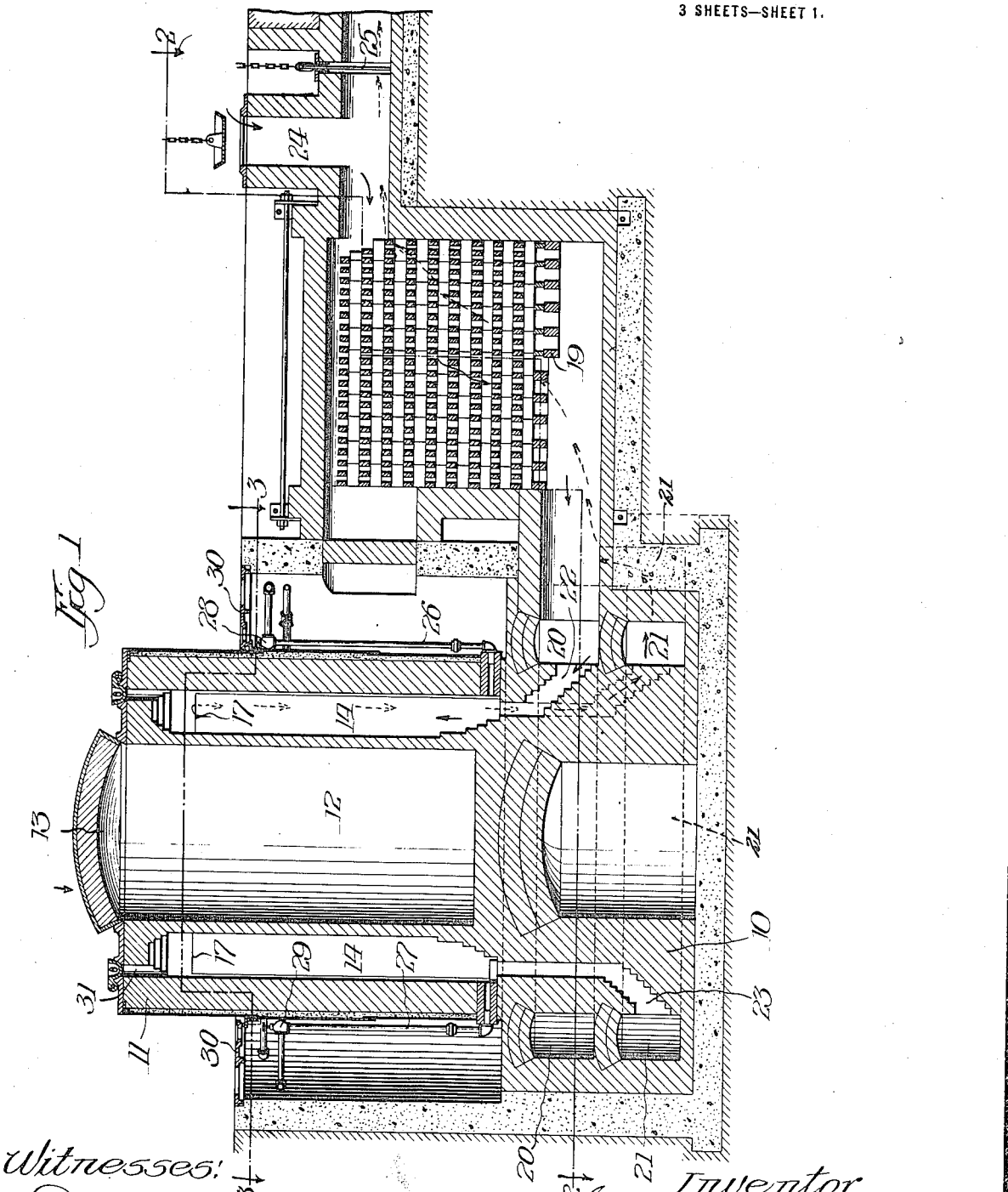

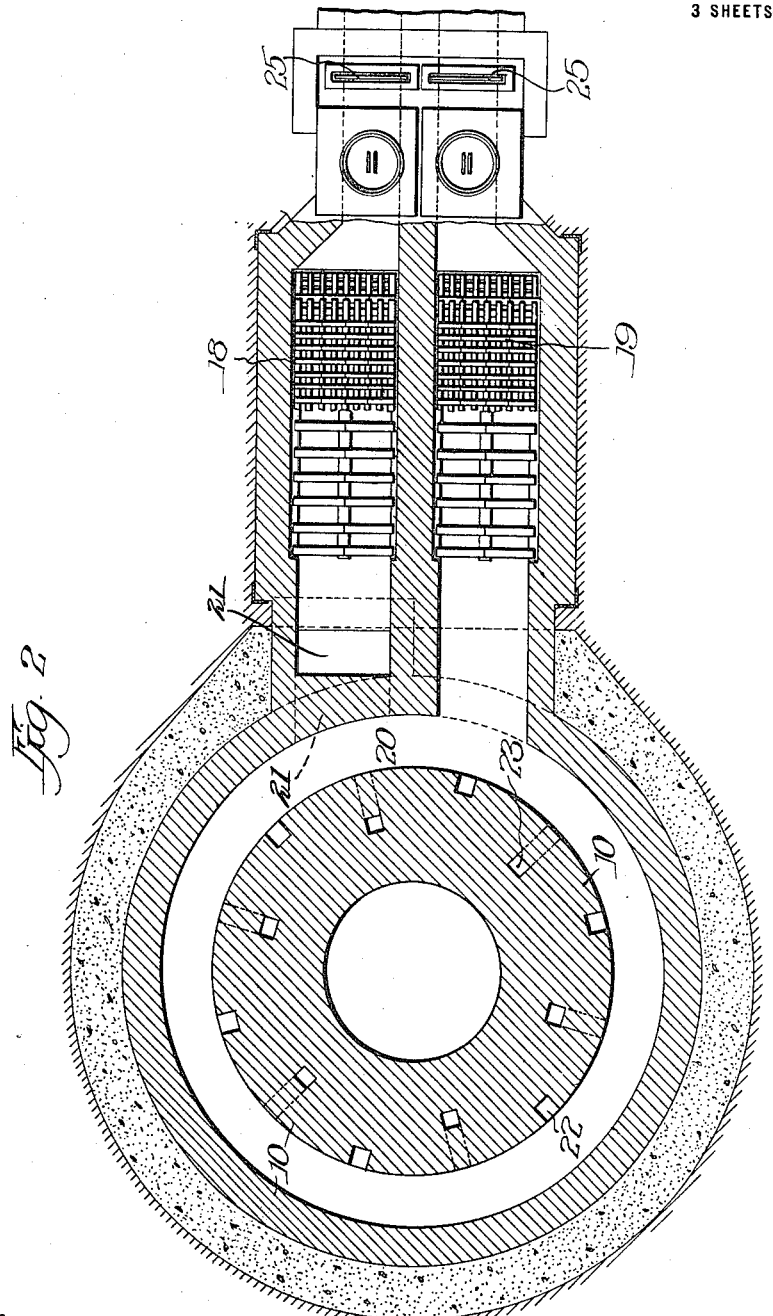

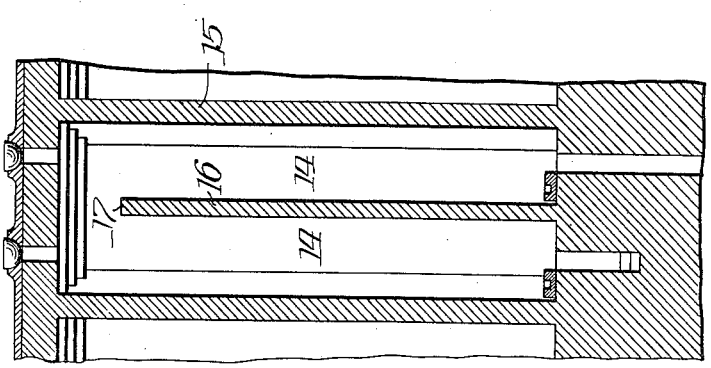
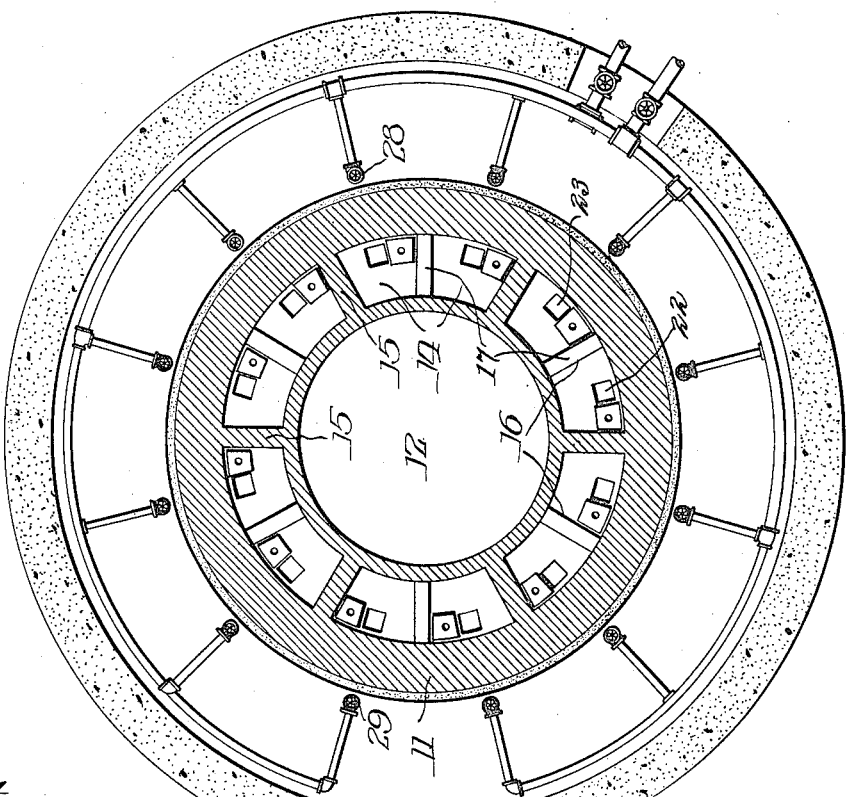

UNITED STATES PATENT OFFICE.

GEORGE G. THORP, OF CHICAGO, ILLINOIS.

FURNACE.

1,144,511.  Specification of Letters Patent.  Patented June 29, 1915.

Application filed May 29, 1914. Serial No. 841,692.

*To all whom it may concern:*

Be it known that I, GEORGE G. THORP, a citizen of the United States, residing at Chicago, in the county of Cook and State of Illinois, have invented certain new and useful Improvements in Furnaces, of which the following is a specification.

My invention relates to heating furnaces and has particular reference to a novel axle heating furnace.

In the practice of heating or reheating railway car axles in the manufacture thereof it has been the custom to allow the flame of the heating element to come in contact with the material composing the axles. This in itself is a serious detriment and a condition arises because of such practice which makes temperature control exceedingly difficult. It will be understood that if the axles are treated in a furnace in which primary combustion takes place, the opening of the furnace in order to insert or remove the axles causes an ingress of cold air which affects the control of the temperature and makes exact calculations based on heat changes practically impossible. That exact heat control in heat treatment is essential is becoming to be well understood. A variation within a very small limit will cause a material change in the molecular structure of the steel and produce an article much different and having much different characteristics from that which was originally intended.

In order to overcome difficulties heretofore experienced I have conceived the idea of conducting the heat treatment of the axles in a retort, that is a space separated from the combustion chambers and which shall not permit the ingress of atmospheric air when the chamber is opened to insert or remove the axles. I have found that by such a construction I am enabled to control the temperature within very small limits. Such a device is preferably provided with combustion chambers in the walls thereof, such chambers being arranged symmetrically around the retort. By reason of such arrangement there need be no change in the fuel and air supply during the period of charging material to or drawing the same from the furnace. Thus it follows that the correct adjustment of the fuel and air supply may be made in order to secure the best results and this adjustment maintained without such changes as would necessarily follow the shutting off of the fuel supply to permit materials to be charged or drawn. I may prefer also to regenerate or recuperate the air employed for combustion.

My invention will be more readily understood by reference to the accompanying drawings, wherein—

Figure 1 is a longitudinal vertical section through a furnace constructed in accordance with my invention; Fig. 2 is a section on the line 2—2 of Fig. 1; Fig. 3 is a section on the line 3—3 of Fig. 1; and Fig. 4 is an enlarged fragmentary section of a combustion chamber.

Referring more particularly to the drawings, it will be seen that I provide a foundation 10 on which a wall 11 is superposed. This wall, for the present purpose, may preferably be circular in outline as best shown in Fig. 3. It serves to outline the retort and incloses a central heating chamber or retort 12 closed except at its top and provided with a cover 13 by means of which the atmosphere is excluded during the heating process.

Arranged in the wall 11 and symmetrically disposed in spaced relation around the retort 12 are combustion chambers 14, 14 divided by walls 15. The walls 15 encompass a pair of combustion chambers in the present construction, these chambers being separated by a further wall 16 which terminates at 17 near the top of the space leaving a passage thereover.

In the present construction I have provided for the regeneration of air and to that end have located regenerators 18, 19 at one side of the furnace connecting one series of chambers 14 to one regenerator by means of the flue 20, and the other series of combustion chambers 14 to the regenerator 18 by means of the flue 21. The flues 20 and 21 communicate with the combustion chambers by means of short flues 22, 23, as best shown in Fig. 1. A simple reversing mechanism is shown in Figs. 1 and 2 in which the air is admitted through the flue 24; the connection to the stack being closed by the gate 25. A similar construction is provided for the regenerator 18.

Gas or other combustible fluid is supplied to the lower end of each of the combustion chambers 14 by means of the pipes 26, 27, the valves 28, 29 for controlling the same being within reach of the operator and located directly beneath a removable floor plate 30. Peep holes 31 are provided by means of which the action of combustion may be observed and controlled as desired.

It would be entirely practical to omit the regenerators and operate the furnace in one direction only. It will, however, be found more economical to include the regenerators, with means for reversing the same, or a recuperator. It is obvious also that other modifications may be made in the structure and I do not wish to be limited to the exact construction herein shown and described.

It will be understood that while I have described my invention as being particularly applicable to the heating of car axles, the construction will be found useful in other situations and for the treatment of other materials.

I claim:

1. In a heating furnace, the combination of walls inclosing a heating chamber, a cover for said chamber whereby the same is normally closed to the atmosphere, pairs of vertical combustion chambers in said walls and surrounding said heating chamber, each pair of combustion chambers constituting a heating unit and said pairs being located in juxtaposition in said wall, and means for supplying a combustible fluid at the lower end of one of said combustion chambers and discharging products of combustion from the lower end of the other of said combustion chambers, substantially as described.

2. In a heating furnace, the combination of walls inclosing a substantially circular heating chamber, means for closing said chamber to the atmosphere and to the direct action of the heating element, and pairs of combustion chambers symmetrically located about said chamber in the walls thereof, each pair of combustion chambers constituting a unit, a plurality of said units being located in juxtaposition and surrounding said heating chamber, substantially as described.

3. In a heating furnace, the combination of walls inclosing a heating chamber, means for closing said chamber to the atmosphere and to the direct action of the heating element, pairs of combustion chambers located in said walls, regenerators, and means for reversing said regenerators and causing primary combustion in alternate combustion chambers, substantially as described.

4. In a heating furnace, the combination of walls outlining a substantially circular heating chamber, means for closing said chamber to the atmosphere and to the direct action of the heating element, heating units in spaced relation in said walls, each unit consisting in a combustion chamber divided by a vertical wall which wall terminates short of the top of said chamber, and means for supplying gas and air to said combustion chambers, substantially as described.

5. In a heating furnace, the combination of walls inclosing a chamber, a cover for closing said chamber to the atmosphere, pairs of combustion chambers located in juxtaposition in said walls, and means for supplying a combustible fluid alternately to one of each of said pairs of combustion chambers, substantially as described.

GEORGE G. THORP.

Witnesses:
A. T. KELLER,
E. L. MOE.

Copies of this patent may be obtained for five cents each, by addressing the "Commissioner of Patents, Washington, D. C."